(12) United States Patent
Astier

(10) Patent No.: US 11,922,369 B2
(45) Date of Patent: Mar. 5, 2024

(54) AUTOMATED FLOW MANAGEMENT IN A COMPOUNDING STATION

(71) Applicant: COMPAGNIE GENERALE DES ETABLISSEMENTS MICHELIN, Clermont-Ferrand (FR)

(72) Inventor: Cedric Astier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 549 days.

(21) Appl. No.: 17/264,665

(22) PCT Filed: Jun. 21, 2019

(86) PCT No.: PCT/FR2019/051517
§ 371 (c)(1),
(2) Date: Jan. 29, 2021

(87) PCT Pub. No.: WO2020/025868
PCT Pub. Date: Feb. 6, 2020

(65) Prior Publication Data
US 2021/0233018 A1    Jul. 29, 2021

(30) Foreign Application Priority Data

Jul. 31, 2018  (FR) ..................... 1857125

(51) Int. Cl.
*G06Q 10/087*   (2023.01)
*B65G 1/04*     (2006.01)
*B65G 1/137*    (2006.01)

(52) U.S. Cl.
CPC ......... *G06Q 10/087* (2013.01); *B65G 1/0492* (2013.01); *B65G 1/1371* (2013.01)

(58) Field of Classification Search
CPC ............ B65G 2201/0273; B29B 13/00; G06Q 10/087; B29D 30/005
See application file for complete search history.

(56) References Cited

U.S. PATENT DOCUMENTS

| | | | |
|---|---|---|---|
| 6,313,212 B1 | 11/2001 | Caretta et al. | |
| 11,351,746 B2* | 6/2022 | Tsoupikov | ............. B29D 30/20 |
| 2004/0194871 A1* | 10/2004 | Caretta | ................ B29D 30/005 |
| | | | 156/111 |
| 2016/0092814 A1* | 3/2016 | Yun | ..................... B29D 30/0601 |
| | | | 705/7.23 |
| 2016/0151868 A1 | 6/2016 | Attucci et al. | |

OTHER PUBLICATIONS

International Search Report dated Sep. 27, 2019, in corresponding PCT/FR2019/051517 (7 pages).

(Continued)

*Primary Examiner* — Timothy R Waggoner
(74) *Attorney, Agent, or Firm* — VENABLE LLP

(57) ABSTRACT

An automated flow management system manages a flow of raw materials and a flow of semi-finished products in order to carry out one or more processes of rubber compounding. An automated flow management process is carried out by the disclosed management system in a compounding facility for manufacturing rubber compounds.

10 Claims, 11 Drawing Sheets

(56) References Cited

OTHER PUBLICATIONS

L. Eitel, "AS/RS design to run new manufacturing and distribution center by 2019", pp. 1-5 (2017), https://www.linearmotiontips.com/asrs-design-run-new-manufacturing-distribution-center-2019 (XP055573386).

"Tire Industry Automation: Now a Necessity", Robotic Magazine, pp. 1-3 (2017), https://www.dimetix-USA.com/tire-industry-automation-necessity (XP055522593).

Shi, Hong-yuan, et al., "Travel Time Analysis of the Single and Dual Command of AS/RS", 2017 29th Chinese Control and Decision Conference (CCDC), IEEE, pp. 3407-3413 (2017) (XP033121164).

Innovations for Intralogistics Manufacturer of Material Handling Equipment (2018), http://europasystems.com/data/include/cms/Katalog-2018/General_catalog_EN_2pager.pdf (XP055559183).

Mazurek et al., "Usine Michelin Montceu . . . inauguration de son nouvel outil: la PA BU!" montceau-neus.com, Mar. 24, 2016 pp. 2-10, 20-21, 31-32, 35, 37, 38, 40, 45-46, http://montceau-news.com/saone-et-loire/304844-usine-michelin-montceau.html, XP055503159.

\* cited by examiner

AUTOMATED FLOW MANAGEMENT IN A COMPOUNDING STATION

TECHNICAL FIELD

The invention generally relates to the production of rubber compounds and vehicle tires prepared therefrom. More particularly, the invention relates to automated flow management, including the management of raw materials and semi-finished products (or "semi-manufactures") in a rubber compounding station. The invention uses an automated management means to facilitate the transport and reception of the materials that are identified in the creation of a chosen rubber compound recipe.

CONTEXT

In the field of rubber compound manufacturing, a series of machines such as internal mixers and external mixers are used for the compounding of raw materials. These raw materials are of different natures such as natural and/or synthetic rubbers, reinforcing fillers (such as carbon black and silica), liquid plasticizers (for example, known oils and resins), additives (for example, 6PPD) and curing agents. In a compounding station, it is known that there is a great diversity in the nature of these raw materials for making the necessary recipes for the manufacture of tires. Depending upon the chosen recipe, the correct quantity, by mass, of these raw materials needs to be delivered, at the right time, to the correct machine. Therefore, the flows generated in the compounding station are very complex. This complexity gives rise to considerable error risks.

Moreover, in present-day stations, the handling and storage of the raw materials represent a major proportion of the surface area of the station, and of the occupation of operators and handling means (for example, using a forklift truck, a lift, a pallet truck, etc.). This all entails significant investment and operating costs. The handling of the reinforcing fillers (such as carbon blacks or silicas) is also a key point due to the volatility of the material.

In a known compounding station, the compounding method uses gravity. The products stored and managed in their dedicated preparation stations (including batching, weighing and preparation) are re-stored (in containers or in transport and/or storage conveyors) until they enter the mixer. The cost of the containers and/or the conveyors, and the integration thereof, is a major part of the method and also requires a large surface area. In the case of the re-stored products, this calls for even more storage surface area. In order to feed the mixer, the products must be transported to the higher floors by conveyor or lift. The management of the flows of materials must also be accurately monitored in order to safeguard the method. All of these manual handling operations can lead to flow management errors. Due to product handling, the flow between the primary products and the end product is not optimized.

In a known storage station, used in combination with other known compounding stations, the products of a chosen rubber compound recipe are stored on the ground in a given surface area. The result is poor management of the surface area. For example, in order to allow access to the products, a percentage of the storage station is dedicated to forklift truck aisles. This aisle percentage can represent a major proportion. The products are typically stored by batch in the remaining storage surface area. One batch, which is generally the equivalent of a lorry load (18 to 24 products), is arranged in one or more bays that represent a multiple of the batch. This bay cannot be re-filled with a new batch until the last product has been removed and used. This batch management results in a bay filling rate of up to 60%.

In order to optimize storage on the ground, metal shelving or stackable products can be used. This helps make use of the wasted space in the storage station. However, in order to access the stackable products, several products need to be moved (for example, if it is necessary to take the product located at the bottom or in the middle). In the case of rack storage systems, the cost of the shelves is high because they need to be able to withstand impacts from forklift trucks and other known storage devices. Moreover, safety regulations also impose storage height limits. These solutions therefore optimize storage but do not solve the problematic situation of handling between stations and floors of a compounding facility.

In the search for solutions for storing, retrieving and dispatching raw materials and semi-manufactures in a compounding station, automated storage systems (for example, "automatic storage and retrieval systems" or "ASRS" and their equivalents) are available that are often used in warehouses and production stations. In order to manage the flow of raw materials as efficiently as possible, the invention concerns the implementation of an automated storage system in order to optimize the space available in a rubber compounding station while improving the efficiency of the associated rubber compounding process. With several levels of similar products arranged both vertically and horizontally relative to the vertical and horizontal arrangements of the respective levels of a compounding station, the overall storage capacity can be increased. The flow of raw materials and semi-manufactures is therefore simplified.

SUMMARY

The invention relates to an automated flow management system for managing a flow of raw materials and a flow of semi-finished products in order to carry out one or more rubber compounding processes, the system including:
  a rubber compounding facility with a rubber compounding station in which compounding processes are carried out according to a chosen rubber compound recipe, the rubber compounding station including several production levels that require the provision of raw materials in order to carry out the corresponding compounding processes at each production level;
  automated storage means having several storage levels and one or more storage levels are linked to each production level of the rubber compounding station, the automated storage means of the management system including:
    at least one raw material storage system with several storage levels that facilitate the storage, transfer and retrieval of the raw materials depending on the processes carried out at the production levels of the rubber compounding station, and with which the management system generates one or more flows of raw materials;
    a semi-finished product storage system with several storage levels at which the semi-finished products from the rubber compounding station are stored, wherein the semi-finished products can be allocated to places depending on the processes carried out at the corresponding production levels in the rubber compounding station, and with which the management system generates one or more flows of semi-finished products; and one or more slave pallets permanently incorporated into each automated storage means that include virtual storage zones in order to facilitate management of the stock and flows of raw materials and semi-finished products.

In certain embodiments, the compounding facility includes several sectors in which compounding processes are carried out, and each sector is dedicated to a distinct process with which the management system is linked, the sectors including:
- a sector with a connecting zone where the raw materials that arrive at the compounding facility are introduced;
- a sector with a raw material storage zone;
- a sector in which the rubber compounding station is arranged with at least one processing zone where the slave pallets are retrieved from the raw material storage system;
- a sector with a semi-finished product storage zone; and
- a sector with a transfer zone where the semi-finished products leave the compounding facility.

In certain embodiments, the management system further includes, at the connecting zone:
- at least one slave pallet dispenser where the slave pallets of the raw material storage system are stacked;
- an entry point arranged next to the dispenser in order for a slave pallet at the dispenser to be loaded with one or more incoming raw material(s) at the entry point;
- a control device that controls the shape of the transferred raw materials;
- an exit where the non-compliant raw materials leave the management system;
- a revolving table that manoeuvres a raw material in order for a unique raw material identification to be recognized;
- an access rail of the connecting zone that is aligned with the raw material storage system; and
- an autonomous vehicle that carries the compliant raw materials to the dedicated spaces in the automated storage system depending on the data integrated within each unique identification.

In certain embodiments, the management system further includes, at the processing zone:
- an exit where the ordered raw materials leave the raw material storage system after they have been retrieved, and the retrieved raw materials are transferred to the corresponding production level of the rubber compounding station;
- a stacking station where the slave pallets are retrieved and stacked;
- an optional cleaning station where the slave pallets are cleaned;
- an entrance is installed in order to accept empty dedicated pallets from a corresponding production level of the rubber compounding station; and
- a control device that ensures the compliance of the dedicated pallets with the dedicated spaces in the automated storage system.

In certain embodiments, the management system further includes at least one robot for selectively placing the raw materials in and selectively removing them from the raw material storage system and selectively placing the semi-finished products in and removing them from the semi-finished product storage system.

In certain embodiments, the management system further includes at least one of the following elements:
- transfer lines on which corresponding conveyors move relative to the raw material storage system and the semi-finished product storage system; and
- a control system that identifies the raw materials and manages them depending on an optimized flow in order to create the chosen rubber compound recipe.

In certain embodiments, the slave pallets of the raw material storage system are loaded with one or more raw materials depending on the chosen rubber compound recipe; and the slave pallets of the semi-finished product storage system are loaded with one or more semi-finished products ordered depending on the chosen rubber compound recipe.

In certain embodiments, the raw materials include at least one raw material chosen from one or more carbon blacks, one or more gums, one or more silicas, one or more chemical products and one or more sulfurs; and the semi-finished products include at least one material chosen from one or more masterbatches, one or more semi-finished materials and one or more materials to be recycled.

The invention also relates to an automated flow management process carried out by the disclosed management system in a compounding facility for manufacturing rubber compounds. The process includes the following steps:
- the step of identifying a category for each of a plurality of raw materials to be used in the compounding facility, in which the identified category is determined from a plurality of different categories depending on the properties of a chosen rubber compound recipe;
- the step of identifying a destination in the management system to which the raw materials need to be transported for each identified category; and
- the step of generating one or more flows of raw materials between the raw material storage system and the rubber compounding station, this step including the step of transporting the raw materials to the identified destination.

In one embodiment of the process, the process further includes the following steps:
- the step of generating one or more flows of semi-finished products between the rubber compounding station and the semi-finished product storage system; and
- the step of classifying the generated flows of raw materials and the generated flows of semi-finished products by self-learning means.

Other aspects of the invention will become clear upon reading the detailed description that follows.

BRIEF DESCRIPTION OF THE DRAWINGS

The nature and the various advantages of the invention will become clearer upon reading the detailed description that follows, in conjunction with the appended drawings, in which identical parts have been given the same reference numbers throughout, and in which.

DETAILED DESCRIPTION

Figure 1:
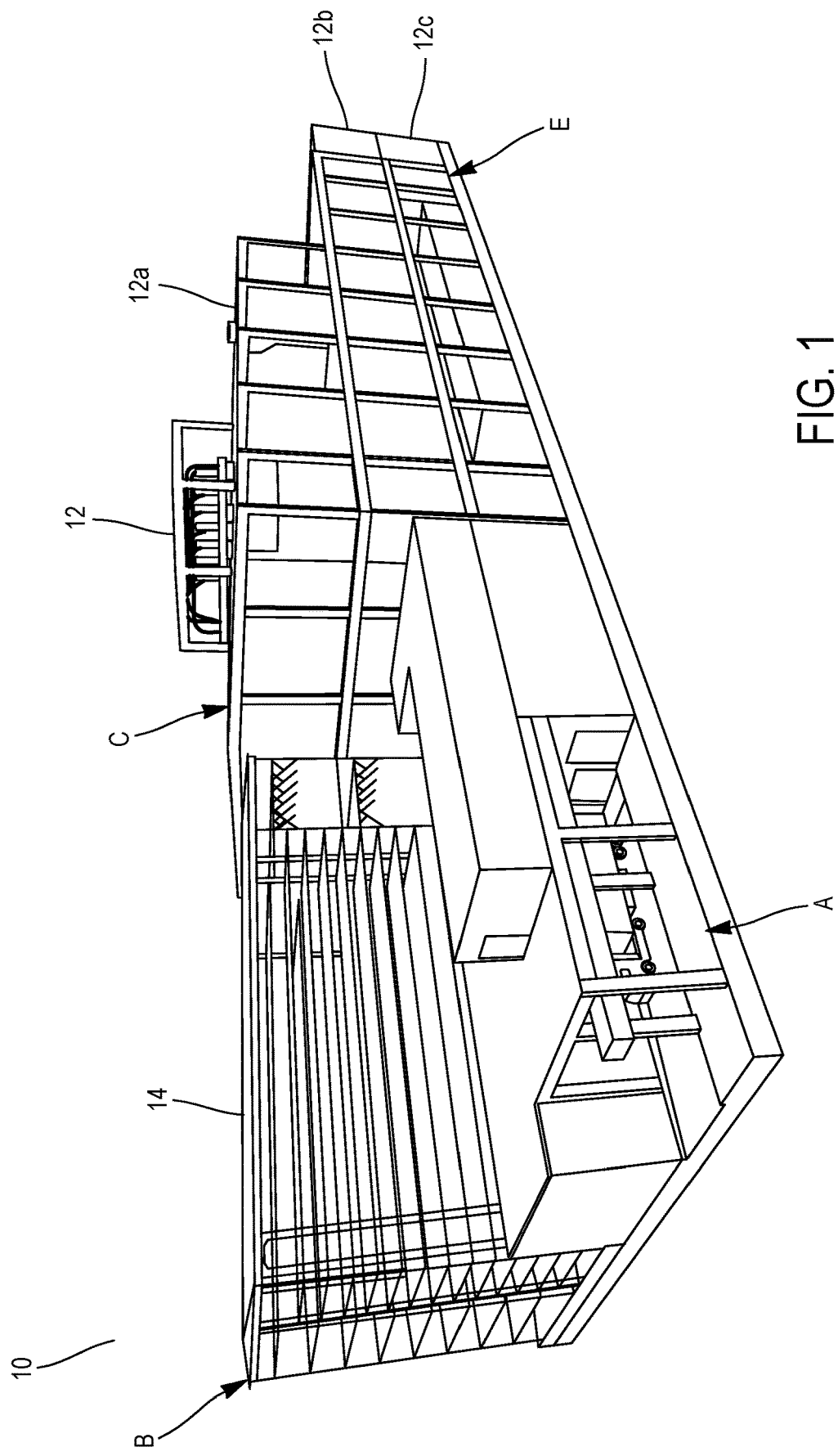
FIGS. 1 and 2 show schematic view of an embodiment of an automated flow management system of the invention.
Figure 2:
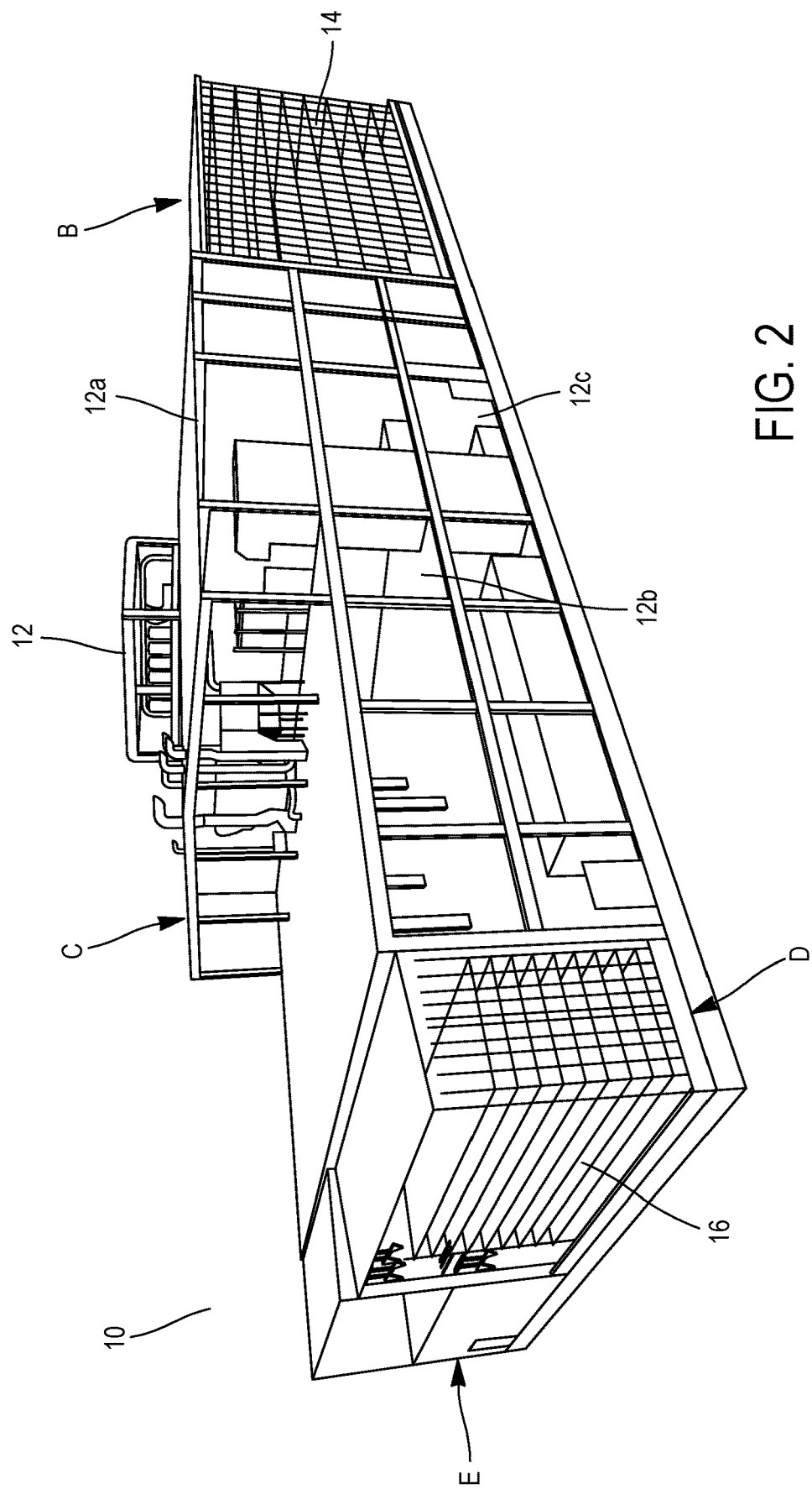

In reference now to the figures, in which the same numbers identify identical elements, FIGS. 1 and 2 show an embodiment of an automated flow management system (or "management system"). In the invention, the term "flow" is understood to mean movement of identified raw materials and semi-finished products between production levels identified as available to receive them. "Available" is understood to mean the production level or levels that are not currently active but that await the arrival of raw materials and semi-finished products and that start their processes upon arrival of the identified raw materials. The term "flow" also refers to a determined time for moving the raw materials of a chosen rubber compound recipe. The time units used can be seconds, minutes, hours, days, weeks and months. The time units used can be equivalents thereof, for example, a time remaining until the system can achieve the best flow of raw materials in the system.

The disclosed management system manages the operational availability of the raw materials and semi-finished products and the execution of processes at several levels of a rubber compounding station (or "compounding facility"). The compounding station is located in a compounding facility that manufactures rubber compounds (for example, for producing one or more products made from rubber, such as tires or tire parts). The management system includes storage units for the raw materials and semi-finished products and autonomous transfer and distribution units for moving the raw materials and the semi-finished products in the compounding facility.

For example, a compounding facility 10 is shown in FIGS. 1 and 2 that includes several sectors in which compounding processes are carried out. Each sector is dedicated to a distinct process with which the management system is linked. Sector A includes a connecting zone where the raw materials that arrive at the compounding facility (for example, by lorry) are introduced (see FIG. 1). Sector B includes a storage zone for storing the raw materials that include, but are not limited to, carbon black, gums (for example, natural gums, synthetic gums, plasticized gums), silica, chemical products and sulfur (see FIGS. 1 and 2). The material products can be stored in bags or in other containers, as shown and described below in reference to FIG. 4. Sector C includes a rubber compounding station (or "station") 12 where compounding processes are carried out according to a chosen rubber compound recipe (see FIGS. 1 and 2). Sector D includes a storage zone for storing the semi-finished products that include, but are not limited to, at least one material chosen from one or more masterbatches, one or more semi-finished materials and one or more materials to be recycled (see FIG. 2). Sector E includes a transfer zone where the semi-finished products leave the compounding facility 10 (for example, by forklift truck) (see FIGS. 1 and 2).

Each level of the compounding station 12 requires the provision of several specific raw materials in order to carry out one or more corresponding compounding processes at each level. The management system allows the identification of the raw materials according to at least one chosen rubber compound recipe. The management system also allows the management and use of the identified raw materials at the corresponding level where a compounding process is carried out during a rubber compound manufacturing cycle. The raw materials that will be required for the processes at the corresponding levels are identified. Taking into account the time allotted for assembling the raw materials needed to make the chosen compound recipe, the management system can identify available raw materials depending on the minimum time required in order to achieve the best flow of raw materials.

Figure 3:
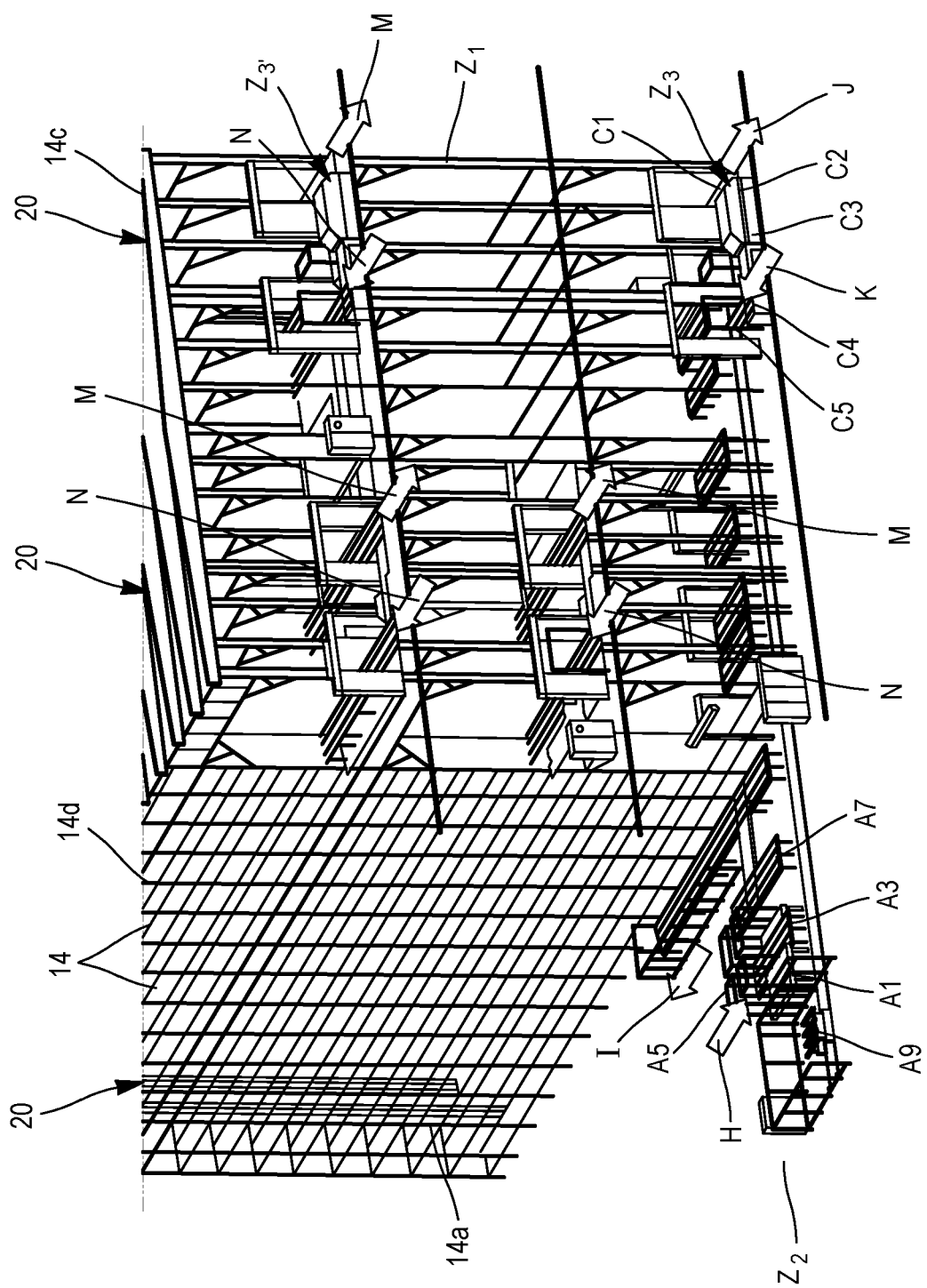
FIG. 3 shows a partial view of a raw material storage system of the management system of FIGS. 1 and 2.

In further reference to FIGS. 1 and 2 and also to FIG. 3, the management system includes automated storage means having several storage levels. Each storage level is linked with at least one production level of the corresponding compounding station 12. The link is provided by one or more conveyors of the management system that are described in greater detail below. The storage levels are operationally associated with each production level of the station and with each other. It is understood that each storage level can be operationally associated with one or more storage levels of at least one other automated storage means. The automated storage systems include "automatic storage and retrieval systems" (or "ASRS") and their equivalents.

The automated storage means of the management system includes at least one raw material storage system 14 of sector B and at least one semi-finished product storage system 16 of sector D. In order to make up a chosen rubber compound recipe, the management system generates one or more flows of raw materials between the raw material storage system 14 and the station 12. The management system also generates one or more flows of semi-finished products between the station 12 and the semi-finished product storage system 14. In the example shown by the figures, the raw material storage system 14 uses a first automated storage system 14c and a second automated storage system 14d. It is understood that each storage system can use one or more automated storage systems.

In certain embodiments, potential flows can be identified, for example, by satisfying the current requirements of the flow and indicating the implementation of the chosen compound recipe. The management system can generate various flows that meet the requirements of one or more known recipes. In certain embodiments, the flows can be classified by using self-learning approaches in which certain flows are more desirable than others.

In the embodiment shown, the compounding station 12 includes three production levels 12a, 12b, 12c in which the compounding processes are carried out using identified raw materials. The raw material storage system 12 includes one or more corresponding storage levels that facilitate the storage, transfer and retrieval of the raw materials depending on the processes carried out at the production levels of the station. It is understood that the compounding station 12 and the raw material storage system 14 can be adapted to a chosen recipe and a desired production target. It is also understood that multiple storage levels can be dedicated to a single production level.

Figure 4:
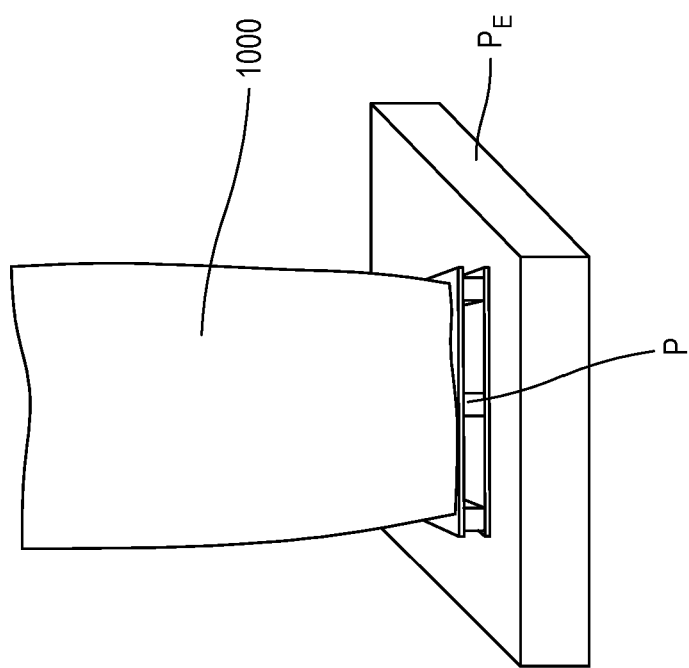
FIG. 4 shows an embodiment of a slave pallet of the shown management system, the slave pallet being loaded with raw materials.

At each storage level of the raw material storage system 14, the raw materials are stored while awaiting transfer during a rubber compounding cycle. In one embodiment, the raw materials are stored depending on the processes carried out at the corresponding production level of the station 12. Referring also to FIG. 4, these raw materials can be supplied to, and transported in, the compounding facility 10, in bags 1000 (also referred to as "big bags"). One or more bags can be transported between identified destinations in and around the compounding station 12, the raw material storage system 14 and the semi-finished product storage system 16. The bags 1000 provide mobile storage allowing the raw materials to be identified, stored and transported. It is understood that other containers can be used. In the invention, the term "container" should be understood to refer to an element that contains or can contain an identified raw material, including but not limited to bags, cartons, boxes and crates. A "bag" or a "container" can also include a reusable bag or container.

In accordance with the requirements of the chosen recipe, the raw materials are stored on associated pallets P (i.e., for all the rubber compounding cycles, the pallets that are dedicated to the identified raw materials). An associated pallet can be loaded with one or more raw materials depending on the chosen rubber compound recipe. An associated pallet can therefore be loaded with one or more bags 1000.

In further reference to FIG. 4, each bag 1000 can be stored and transported, with its associated pallet P, in the management system by means of a slave pallet (or "dummy pallet") $P_E$ that forms part of the management system. The slave pallets $P_E$ therefore become virtual storage zones for facilitating management of the stock and flows of raw materials used for compounding a rubber. The slave pallets $P_E$ never leave the raw material storage system 14, in order to maintain its geometry. In order to ensure the correct positioning of the raw materials, the slave pallet $P_E$ can include one or more location indicators (not shown) that cover at least part of the surface of the pallet. The location indicators can be used to ensure the correct positioning of the raw materials on the slave pallet. In some embodiments, the slave pallet $P_E$ can include a retaining means (for example, a barrier or other equivalent means) for ensuring the correct positioning of the raw materials on the slave pallet.

In this embodiment, each of the raw materials is characterized by a unique identification (for example, using numbers, codes, RFID identifications, hypertext links or equivalent means) by means of which a controller (for example, a PLC or an equivalent control system) can identify the raw materials and can determine additional information (for example, to update the arrival time and storage duration of a raw material in the raw material storage system 14). In one embodiment, owing to an identification means integrated into the bags and/or the associated pallets, the bags and their content (i.e., the raw materials having known properties) are identified, recognized and managed. The control system manages the flows of raw materials through the raw material storage system 14 such that the best flow is implemented in order to create the chosen rubber compound recipe.

A control system can be configured to store the raw materials in the raw material storage system 14. The control system can identify the stored associated pallets P such that specific pallets (either slave pallets of the management system or associated pallets) can be found and retrieved at any time. Groups of associated pallets can be created and can be placed in dedicated locations of the raw material storage system. A pallet can be identified by known identification means, either manually (for example, by using at least one visual, audio and/or tactile indication) or automatically (for example, by using numbers, codes, RFID identifications, hypertext links or equivalent means), in order to match the identification of the pallet with the identification of the raw materials loaded on the pallet. The management system therefore helps improve forecasts of the flow and the space required for raw materials in storage.

At the raw material storage system 14, storage levels are used to store and transfer raw materials while awaiting the transfer of same during a rubber compounding cycle. In the embodiment shown by FIG. 3, the raw materials that include the "reinforcing fillers" and the additives in power form (including carbon blacks, silicas and chemical products) are stored in the raw material storage system 14 so as to minimize the movements thereof relative to the corresponding production levels of the station 12. For example, the carbon blacks are stored in the lower levels close to the production levels that use the carbon blacks. The chemical products are stored in the upper levels close to the production levels that use the chemical products. The silicas are stored, in view of their inert properties, in the intermediate levels close to the production levels that use the silicas, thus separating them from the carbon blacks and the chemical products.

In further reference to FIG. 3, the control system is programmed to retrieve the required raw materials from the raw material storage system 14. The control system is also programmed to deliver these materials to the corresponding production level of the station 12. The control system is programmed to transfer the raw materials through a transfer zone $Z_1$ and to specify a frequency at which the transfer should take place. In a rubber compounding process carried out by the management system, a step of specifying this frequency includes specifying the frequency at which empty slave pallets and loaded slave pallets are transferred between production levels of the station 12 and corresponding levels of the raw material storage system 14.

Figure 5:
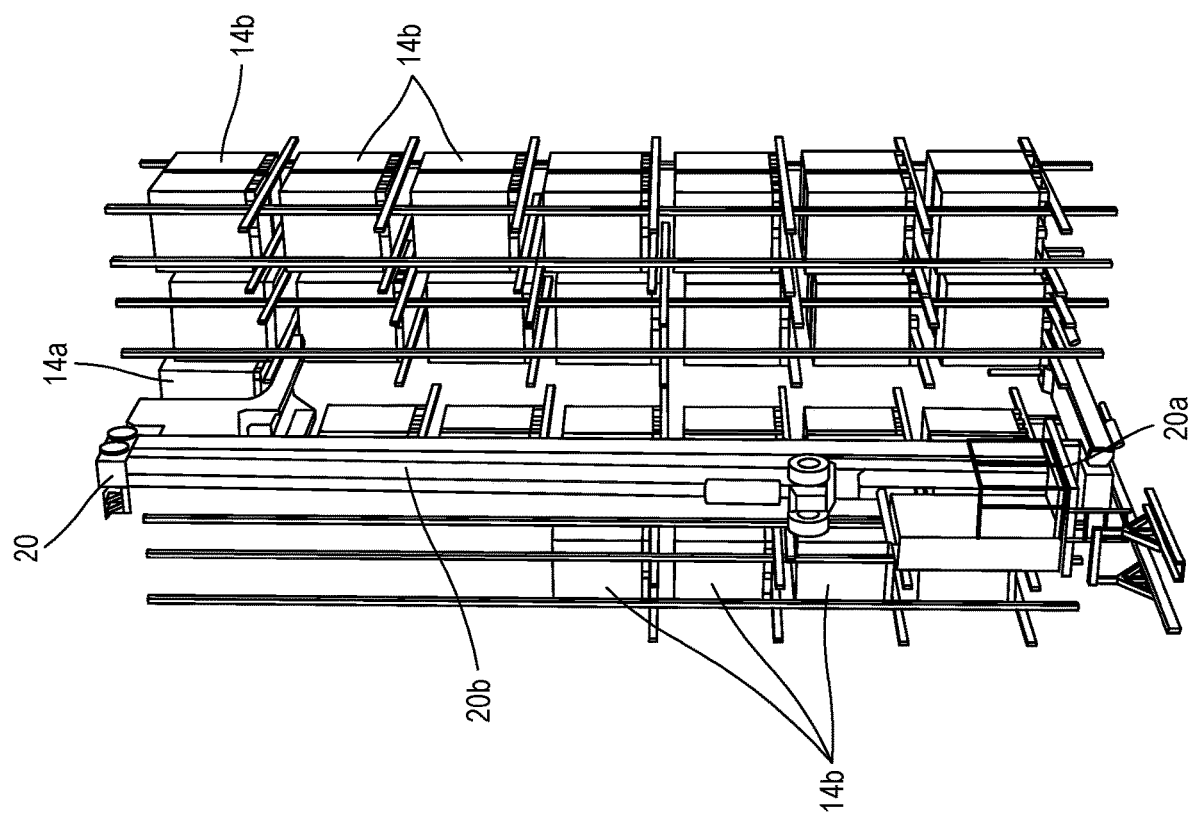
FIG. 5 shows a partial view of a stacking device used in the raw material storage system of FIG. 4, and in the semi-finished product storage system of FIG. 8.

In further reference to FIGS. 1 to 4 and also to FIG. 5, there are several corridors 14a that pass through all the storage levels of the raw material storage system 14. The corridors 14a define, together with the corresponding rows 14b, the locations for storing the raw materials. The raw materials can be allocated to locations in the raw material storage system 14 depending on the processes carried out at the corresponding production levels of the station 12. For example, it is understood that the slave pallets loaded with bags of raw materials can be placed in locations allocated depending on the requirements of a recipe that is underway and/or depending on the requirements of a future recipe. It is also understood that empty slave pallets, being associated with specific raw materials, can be placed in the same locations allocated to loaded pallets (i.e., the same slave pallets, loaded or empty, can return to the same locations associated with the associated raw material or raw material). For example, if a compounding process of the level 12b needs a bag 1000 filled with a raw material used in this process, the management system will store the bag 1000 at the level 12b.

The locations are served by at least one robot (or equivalent device) that is capable of selectively placing and selectively removing at least one bag of raw materials, with its associated pallet, relative to the raw material storage system 14. The selective placement and selective removal are carried out on the basis of a prediction of raw materials that is made for a flow generated according to the chosen rubber compound recipe. The robot, which is chosen from commercially available robots, is shown as a stacking device 20 with a shuttle 20a that travels up and down a rail 20b depending on a location of a raw material (for example, as contained in the bag 1000 in FIG. 4) in the raw material storage system 14. The stacking device 20 places and retrieves raw materials depending on at least one current flow and future flows. In one embodiment, there are two shuttles 20a that travel up and down the rail 20b at the same time as the device moves along the corridor 14a. It is understood that the stacking device 20 can be replaced with an equivalent device known to a person skilled in the art.

Figure 6:
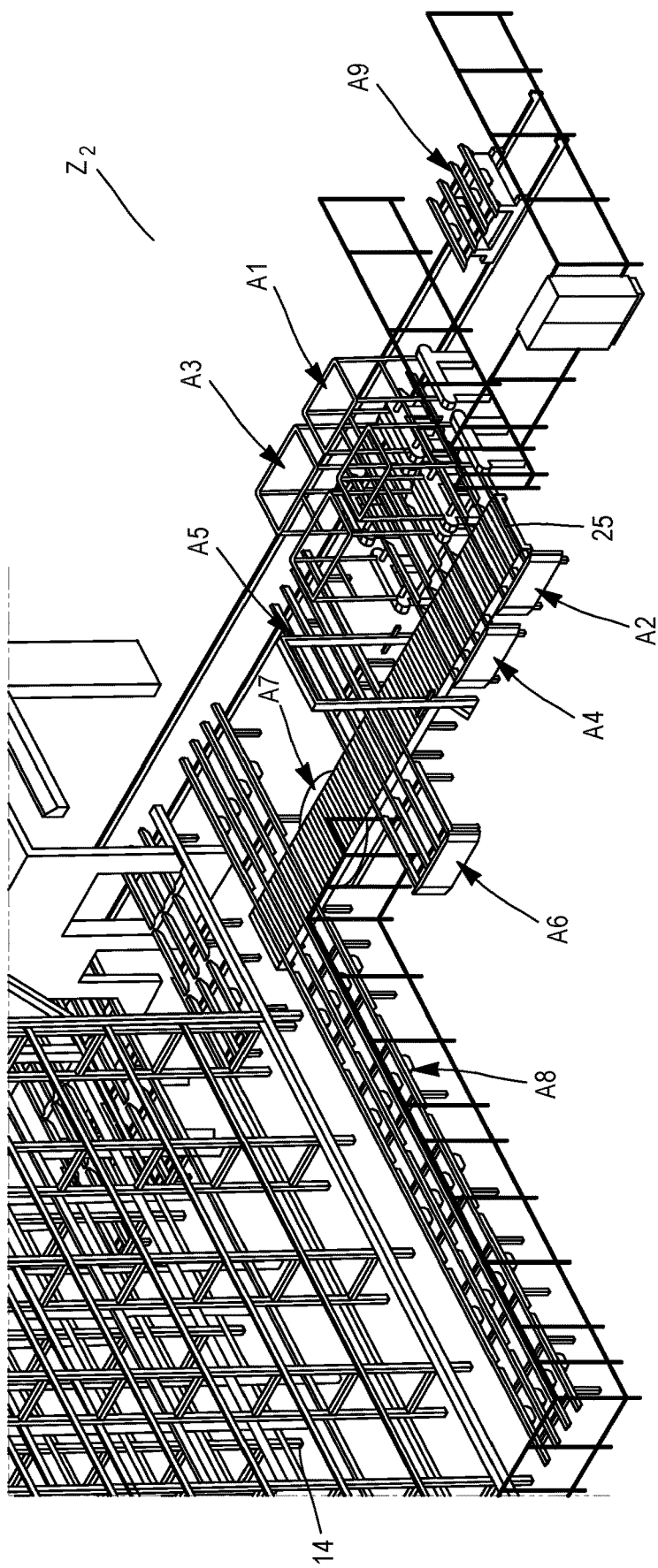
FIG. 6 shows a schematic top view of a connecting zone where the raw materials arrive at the compounding facility of FIGS. 1 and 2.

In further reference to FIG. 5 and also to FIG. 6, a connecting zone $Z_2$ of sector A is shown in which the raw materials arrive at the compounding facility 10 in order to be stored in the raw material storage system 14. The raw materials include not only the fillers and additives in powder form as described. They also include elastomers that are routinely sold commercially in bales of known weight. The elastomers are chosen from a natural rubber, various synthetic elastomers (for example butadiene-styrene rubber, polybutadiene rubber, etc.) and various elastomer mixtures. Other raw materials can be introduced at sector A, as understood by a person skilled in the art.

In the connecting zone $Z_2$, the management system includes at least one slave pallet dispenser (or "dispenser") A1 where the slave pallets are stacked (see the slave pallet $P_E$ described with respect to FIG. 4). As shown in FIG. 6, the dispenser A1 is empty, but it is understood that slave pallets can be stored in the dispenser A1 in a known manner. The stacked slave pallets are always dedicated to a specific raw material or to a specific class of raw materials. An entry point A2 is arranged next to the dispenser A1 in order for a slave pallet $P_E$ from the dispenser to be loaded with one or more incoming raw materials at the entry point (see the arrow H in FIG. 3). In order to supply an automated storage system of the raw material storage system 14, the slave pallet $P_E$ with the loaded materials (in a bag, a container or in bale form) is conveyed to the automated storage system by a conveyor or belt 25. It is understood that the conveyor 25 can be replaced with two or more conveyors, a combination of conveyors and belts, and equivalent transfer means.

In embodiments in which the raw material storage system 14 uses two or more automated storage systems, there is a dispenser and an entry point associated with each automated storage system. A second dispenser A3 and an associated second entry point A4 are therefore provided. In order to supply the second automated storage system 14*d*, the slave pallets from the second dispenser A3 are transferred by the conveyor 25.

The connecting zone $Z_2$ includes a control device A5 that ensures that the shape of the raw materials transferred by the conveyor 25 complies with the dedicated locations of the automated storage system. The control device A5 can include a frame 31 that allows the conveyor 25 and its slave pallets $P_E$ and bags 1000 being transported to pass freely therethrough. The bags 1000 and raw materials in other forms obtained commercially must be shaped in such a way as to pass through the control A5 in order for the management system to be able to transfer only the raw materials that comply with the parameters of the dedicated spaces. It is understood that the frame 31 can be a barrier (either physical or electronic), and its parameters can be adjusted depending on the parameters of the dedicated spaces in the automated storage system.

A monitoring system incorporated into the management system ensures the delivery of the raw materials that correspond to the established parameters, including a correspondence between ordered raw materials and their properties, received raw materials and their properties, and raw materials required by the processes at the production levels involved. The unique identifications associated with each raw material and each slave pallet are used to automatically transfer all the relevant data in order to store the raw materials at one (or more) correct storage level(s). If a raw material is loaded onto a different delivery pallet from the slave pallet $P_E$, this delivery pallet is placed on the slave pallet $P_E$ and the unique identifications of the two pallets and the raw materials are associated in order to allow each pallet and each raw material to be located and tracked. If the monitoring system determines that the raw material travelling to the control A5 does not comply with the established parameters, this non-compliant raw material is directed to an exit A6 of the connecting zone $Z_2$ (see the arrow I in FIG. 3). The non-compliant raw materials thus leave the management system upstream of the raw material storage system 14, preventing non-usable raw materials from being stored in the station 12. These non-compliant raw materials that leave the management system can be stored in a separate storage system while awaiting an order for these raw materials by the station 12.

If the monitoring system determines that the raw material travelling to the control A5 does comply with the established parameters, the conveyor 25 transfers it to a revolving table A7 of the connecting zone $Z_2$. The revolving table A7 receives each compliant raw material after it has passed to the control A5. The revolving table A7 includes a rotating device that, if required, allows the bag to be maneuvered (for example, to face an operator) in order for the unique identification of the raw material to be recognized. The revolving table A7 includes a transfer means that aligns with the conveyor 25 in order to transfer the raw materials to the dedicated spaces in the raw material storage system 14.

The conveyor 25 transfers the compliant raw materials to an access rail A8 of the connecting zone $Z_2$ that is aligned with the raw material storage system 14. An autonomous vehicle A9 carries the compliant raw materials to the dedicated locations of the automated storage system depending on the data integrated within each unique identification. The autonomous vehicle A9 can be chosen from commercially available autonomous vehicles, including vehicles guided on rails, as shown in FIG. 6.

Figure 7:
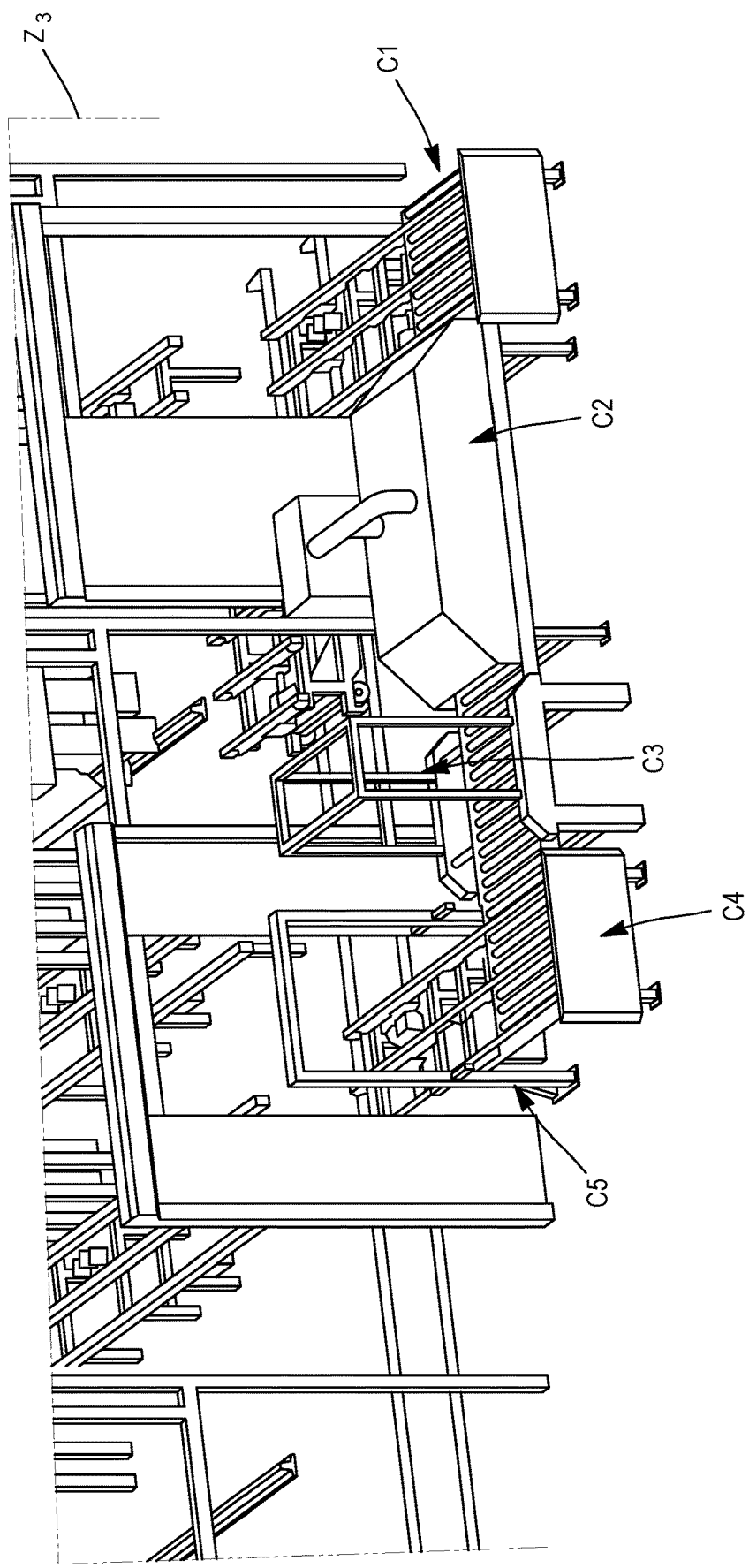
FIG. 7 shows a schematic perspective view of a processing zone of the shown management system.

In further reference to FIGS. 1 to 3 and also to FIG. 7, the management system includes at least one processing zone $Z_3$ close to the sector C where the slave pallets $P_E$ are retrieved from the raw material storage system 14. The processing zone $Z_3$ shown in FIG. 7 is installed in the immediate vicinity of the production level 12*c* of the station 12. It is understood that similar processing zones can be installed at other production levels of the station 12 (for example, in FIG. 3, see a second processing zone $Z_3$, installed in the immediate vicinity of the production level of the station 12*a*).

The processing zone $Z_3$ includes an exit C1 where the ordered raw materials leave the raw material storage system 14 after they have been retrieved (see the arrow J in FIG. 3). The retrieved raw materials are transferred to the corresponding production level (in this example, the production level 12*c* of the station 12). The transfer is carried out by known means, for example, by forklift trucks, by autonomous industrial vehicles and/or by other equivalent means. The slave pallets $P_E$ never leave the management system, and they are retrieved and stacked at a stacking station C2. In the case of certain slave pallets (for example, slave pallets that are always loaded with chemical products), the management system can order the cleaning of the pallets at a cleaning station C3 of the processing zone $Z_3$. The cleaning can be carried out by vacuuming, brushing, and other known means in order to clean the pallets in question after they have been used in the station 12 in order to meet the requirements of a future flow. All the pallets can be cleaned, but the pallets containing the powders should preferably be cleaned. At processing zone $Z_3$, an entrance C4 is installed for accepting the empty dedicated pallets from the corresponding production level (in this example, the production level 12c of the station 12). A conveyor transfers the empty dedicated pallets towards a control device C5 of the processing zone $Z_3$ that ensures the compliance of the dedicated pallets with the dedicated locations in the automated storage system (see the arrow K in FIG. 3). The control device C5 functions in a manner similar to the control device A5 described above.

At each production level of the station 12, the management system includes corresponding transfer lines on which corresponding conveyors move relative to the raw material storage system 14. In further reference to FIG. 3, longitudinal transfer lines extend in a longitudinal direction parallel to the corridors 14a. The longitudinal transfer lines include outgoing transfer lines on which the pallets loaded with associated the raw materials leave the raw material storage system 14 in order to supply the equipment at the corresponding production level of the station 12 (e.g., the equipment carrying out the compounding processes in an internal mixer) (see the arrows M in FIG. 3). The longitudinal transfer lines also include incoming transfer lines on which the empty pallets enter the raw material storage system 14 from the corresponding production level (see the arrows N in FIG. 3). Empty pallets may or may not return to an equivalent location to that from which the pallet was retrieved or directly to the connecting zone $Z_2$.

The management system can therefore record the retrieval of the ordered raw materials and the associated pallets. The management system is capable of updating the storage of the raw materials in the raw material storage system 14 and the availability of the associated pallets. The management system can send the empty pallets to the raw material storage system 14 (see FIG. 6). If necessary, empty slave pallets $P_E$ can be placed in the raw material storage system 14 in order to meet the requirements of a future flow. Improved efficiency is therefore achieved by reducing the transit journeys for reloading the slave pallets.

Figure 8:
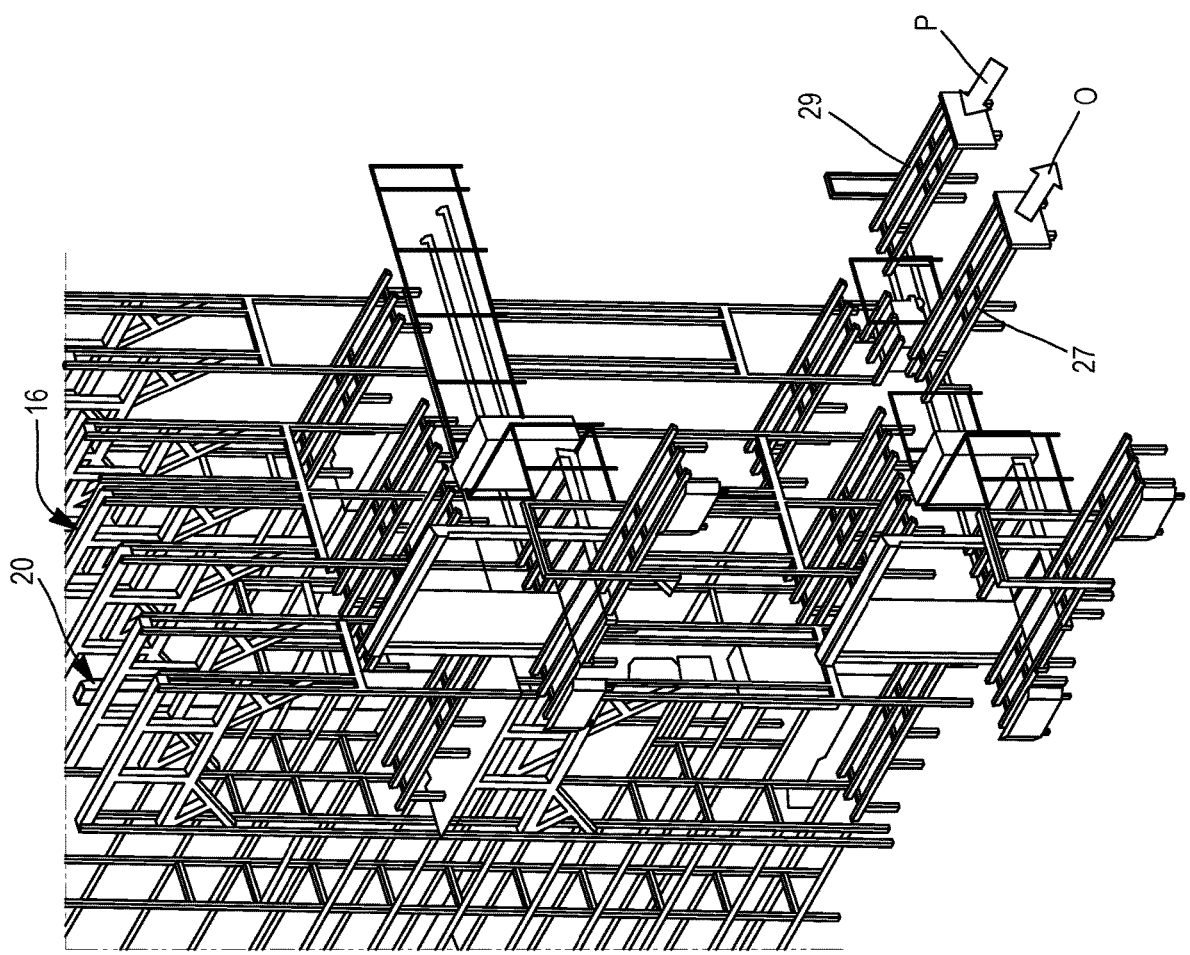
FIG. 8 shows a partial view of a semi-finished product storage system of the shown management system.

In further reference to FIGS. 1 to 7 and also to FIG. 8, the management system further includes the semi-finished product storage system 16 in which the semi-finished products from the station 12 are stored (for example, until they are used in one or more processes downstream of the station). Depending on the requirements of the chosen recipe, the semi-finished products are stored on associated pallets. The semi-finished products and their associated pallets are guided in the semi-finished product storage system 16 by the slave pallets (or "dummy pallets") $P_E$. Several corridors pass through all levels of the semi-finished product storage system 16 and together define, with corresponding rows, the locations for storing the semi-finished products. The semi-finished products can be allocated to locations in the semi-finished product storage system depending upon the processes carried out at the corresponding production levels. It is understood that the slave pallets associated with specific semi-finished products (either loaded or empty) can be placed in the same allocated locations (i.e., the same pallets, loaded or empty, can return to the same locations or to the same sectors associated with the associated semi-finished products).

The locations in the semi-finished product storage system 16 are served by a robot or an equivalent device (for example, by a stacking device 20 as described in relation to the raw material storage system 14 and shown in FIG. 5). Selective placement and selective removal are carried out on the basis of a prediction of semi-finished products that is made for a generated flow. At each production level of the station 12, the management system includes corresponding transfer lines on which corresponding conveyors move relative to the semi-finished product storage system 16.

The management system can therefore record the storage and retrieval of the semi-finished products and their associated pallets. The management system is capable of updating the storage of the semi-finished products in the semi-finished product storage system 16 and the availability of the associated pallets. The management system is also capable of placing empty slave pallets $P_E$ in the semi-finished product storage system 16 in order to meet the requirements of a future flow.

In an example of a flow taking place in the semi-finished product storage system 16, the management system identifies a semi-finished product for retrieval and retrieves it from the semi-finished product storage system. The management system sends the ordered semi-finished product to an outgoing conveyor 27 (see the arrow O in FIG. 8). An operator (either human or machine) takes the semi-finished product that was ordered (either manually or automatically) and its associated pallet in order to use the semi-finished product in another compounding process. The slave pallet remains in the management system for use in the semi-finished product storage system 16. The slave pallet can be cleaned (for example, as described above in relation to the processing zone $Z_3$), and can be transported to an incoming conveyor 29, where it waits on standby. The empty associated pallets are collected in order to be returned to storage on the waiting slave pallet (see arrow P in FIG. 8).

By using the management system, respective slave pallets (loaded and empty) can carry out transfer and delivery operations in the context of the processes performed at the corresponding production levels of the station 12, thus carrying out transfer and distribution operations over short distances without polluting the intermediate production levels. The entry and exit of loaded and empty pallets can thus be achieved efficiently in both storage systems.

In one embodiment of the process that satisfies the requirements of a flow, the process includes a step of generating at least one flow in order to make at least one rubber compound recipe. In some embodiments, several flows can be generated depending upon the selection made by a user.

The process includes a step of identifying the raw materials that meet the requirements of at least one generated flow. Taking into account the time required for assembling the raw materials needed to make the selected compound recipe, the management system can identify locations where the raw materials are available on associated pallets (slave pallets and dedicated pallets). This identification can be performed on the basis of the minimum time required to carry out the compounding operation. Moreover, the management system can identify whether raw materials required for the compounding operation are missing. In this case, the management system can order the missing raw materials in order for them to be retrieved from the raw material storage system 14 and delivered to the corresponding production level (or levels) of the station 12. By using known devices (for example, stacking device 20), the pallets loaded with ordered raw materials are stored in, and retrieved from, the raw material storage system 14, depending on the function of the station where they are required.

The process can include a step of carrying out at least one planning activity that is necessary in order to complete the current flow and/or at least one future flow. The planning activity can include one or more steps, including at least the following steps of:

determining expected storage levels in the raw material system 14 and in the semi-finished product storage system 16 at the end of the current flow;

determining the state of the current flow;

predicting the flows that will be carried out as a result of the current flow and future flows; and determining the raw materials that will be used in future flows (including the storage duration of raw materials prior to use).

These determinations can be made on the basis of one or more factors including, but not limited to, the completion of one or more flows (and the resulting storage of the raw materials remaining in the management system), the generation and adaptation of future flows, and the current storage level in the semi-finished product storage system 16.

The process includes a step of ordering at least one raw material that meets the requirements of the current flow. During this step, the control system sends a retrieval order to the raw material storage system 14, for example to retrieve the slave pallets $P_E$ associated with these raw materials.

The process includes a step of automatically retrieving ordered slave pallets $P_E$ that meet the requirements of the current flow. This step can include a step of determining whether a slave pallet still needs to be loaded with the associated raw material.

If the raw materials stored in the raw material storage system 14 do not meet the requirements of the first flow, the management system can adapt the flow in order to use available raw materials. This adapted flow takes place at the same time as the management system can order raw materials necessary in order to carry out the original flow. Thus, each of the current parameters in the raw material storage system 14 and the projected stock in the semi-finished product storage system 16 are dynamically monitored in order to dynamically classify the flows such that the best flow (for example, the best flow as a function of time) is always possible. This can be carried out in order to prioritize production depending on the demand for semi-finished products, the surplus of semi-finished products, the shortage of raw materials and associated factors.

The process includes a step of automatically sending the ordered raw materials according to the current flow. The associated pallets that are retrieved from the raw material storage system 14 are sent to a corresponding production level of the station 12 in order to carry out the processes in which the ordered raw materials are required. For example, if there is an insufficient quantity of silica in station 12, the control system can order the retrieval of the silica containers stored at the intermediate levels of the raw material storage system 14. The slave pallets $P_E$ associated with the ordered silicas are directed by conveyors towards the station 12 (and, more particularly, towards the production level involved).

The process includes a step, after completion of the compounding processes that produce semi-finished products, of loading the semi-finished products onto associated dedicated pallets. The control system can designate the semi-finished product storage level(s) in the semi-finished product storage system 16 where the semi-finished products will be stored (for example, while awaiting processes downstream of the management system). The management system can manage the semi-finished products and their associated dedicated pallets in the same way as the raw materials and their associated slave pallets are managed in the raw material storage system 14.

Figure 9:
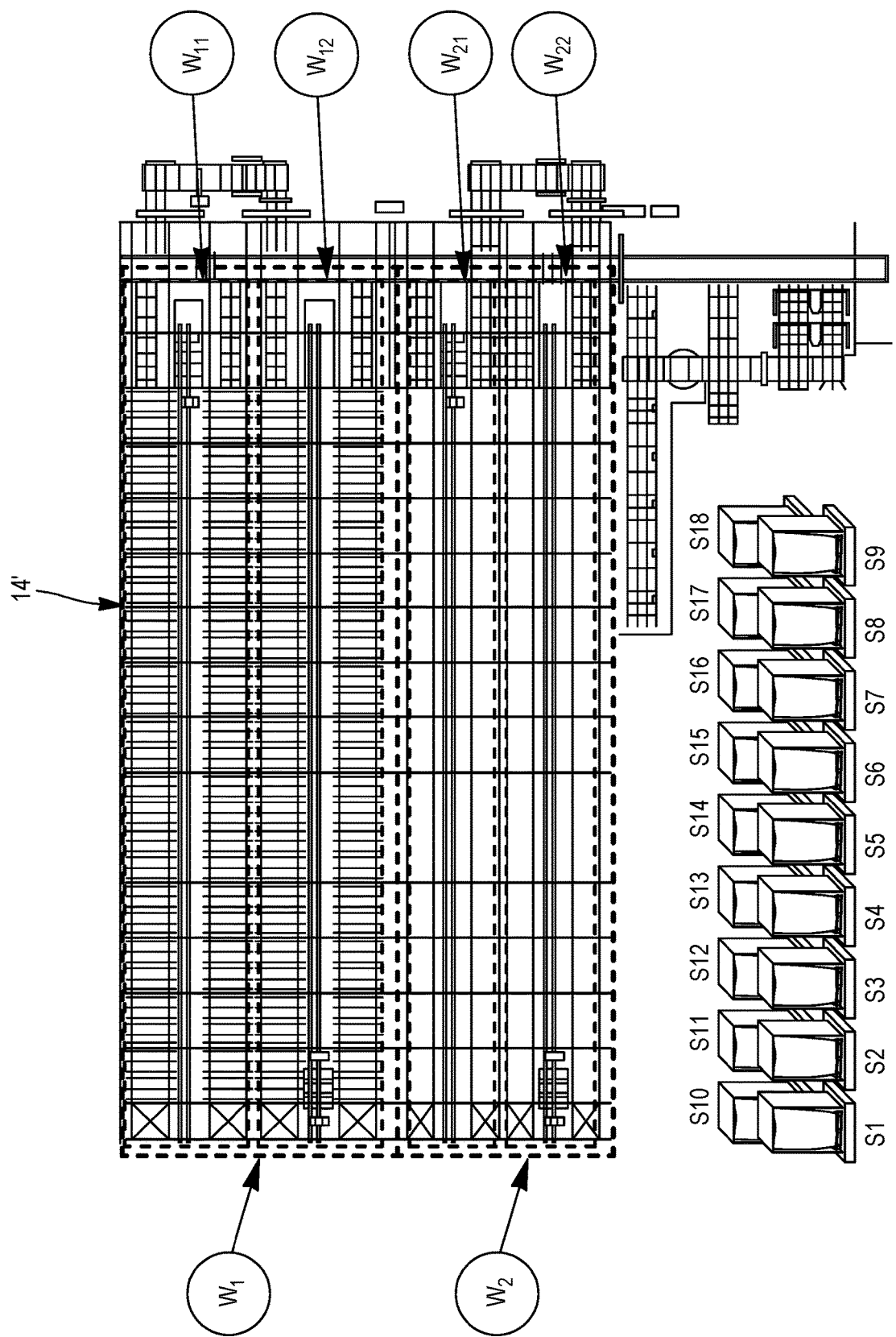
FIGS. 9, 10 and 11 show an example of automated flow management carried out by the management system of the invention according to a generated.
Figure 10:
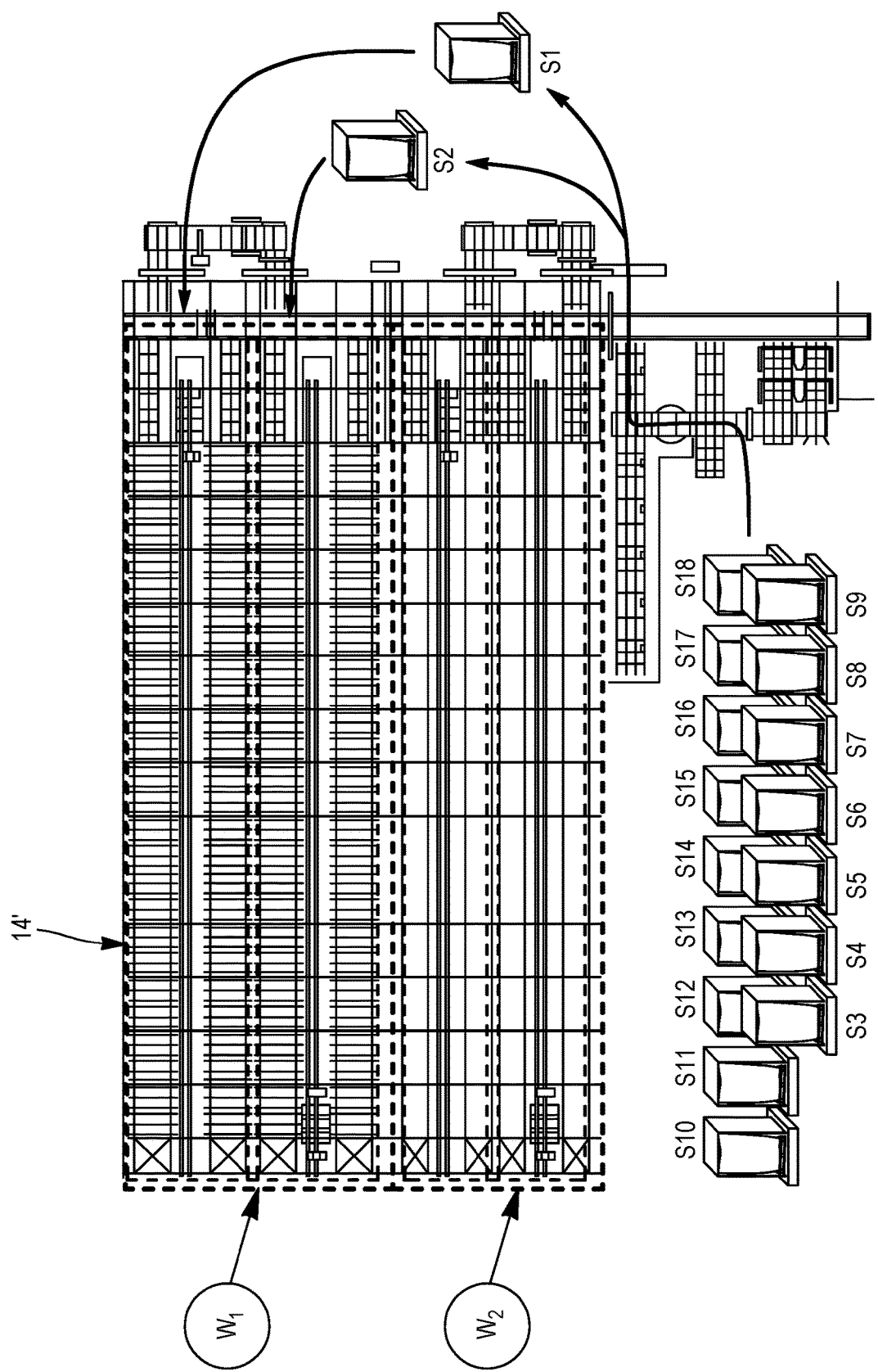
Figure 11:
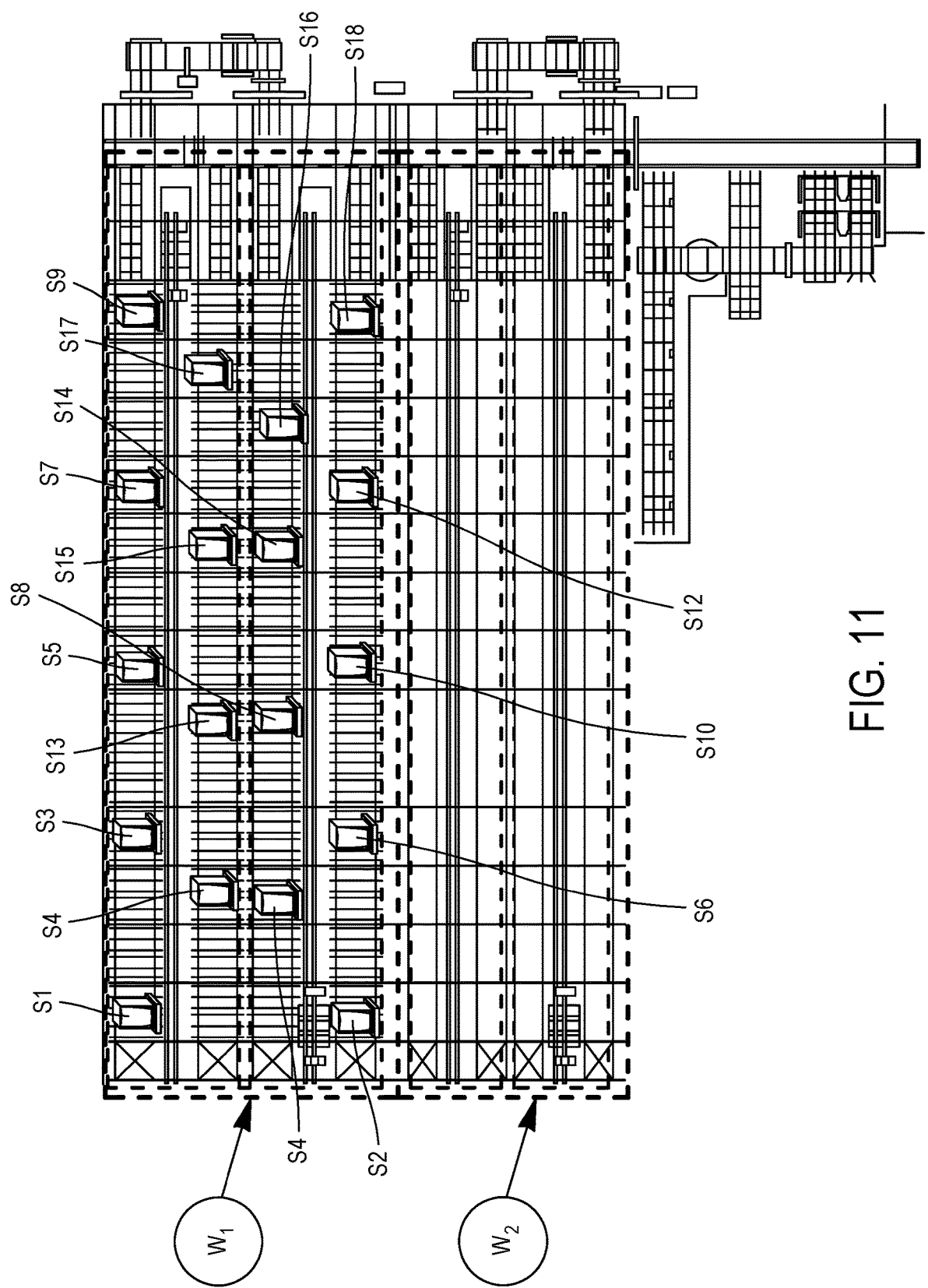

In reference to FIGS. 9 to 11, an example of automated flow management, carried out by the management system of the invention, is shown in relation to a raw material storage system 14'. In this example, the raw material storage system 14' includes two warehouses $W_1$, $W_2$, and each warehouse includes two automated storage systems ($W_{11}$, $W_{12}$), ($W_{21}$, $W_{22}$). In reference to FIG. 9, in order to store carbon black according to a planned flow, a batch of carbon black arrives at the raw material storage system 14 in 18 bags (S1, S2, S3, S4, S5, S6, S7, S8, S9, S10, S11, S12, S13, S14, S15, S16, S17, S18). All the bags shown and their associated pallets can be transported by slave pallets $P_E$ of the management system.

The planned flow involves the automated storage systems $W_{11}$, $W_{12}$ of the warehouse $W_1$.

Each automated storage system $W_{11}$, $W_{12}$ includes several storage levels arranged in rows separated by a corridor $W_C$. A stacking device $W_{20}$ that crosses a corresponding corridor serves each row of each automated storage system. In reference to FIG. 10, in implementing the flow, the management system follows redundancy rules established by the flow plan in order to ensure the availability of carbon black throughout the warehouse $W_1$. Following the redundancy rules, the management system automatically directs each bag in turn towards the two automated storage systems $W_{11}$, $W_{12}$. Therefore, the management system directs the bag S1 towards the automated storage system $W_{11}$, the bag S2 towards the automated storage system $W_{12}$, the bag S3 towards the automated storage system $W_{11}$, the bag S4 towards the automated storage system $W_{12}$, etc. When the last bag S18 is stored at the automated storage system $W_{12}$, the batch is equally divided between the two automated storage systems $W_{11}$, $W_{12}$ (see FIG. 11). The carbon black order placed during the processes of station 12 is therefore easily met in the context of the flow.

A cycle of the process can be performed under the control of the PLC and can include pre-programming of the management information. For example, a profile can be associated with each raw material including a weight of the ordered raw material, the location of the ordered raw material, and the reception and sending of data indicating the transfer of the ordered raw material to the corresponding production level in the station 12. The PLC controls the list of ordered raw materials and the associated pallets. For all embodiments, a profile may be established in order to ensure the reproducibility of an ideal flow for making a chosen rubber compound recipe.

The management system can include a monitoring system that can monitor one or more processes in the management system, including but not limited to one or more compounding processes of the station 12 (where monitoring can be carried out at each production level), and one or more safety processes (for example, to ensure the continuous passage and the safe passage of the raw materials and the semi-finished products). At least part of the monitoring system can be provided in a portable device such as a mobile network device (for example, a mobile phone, a laptop computer, a portable device connected to the network, portable clothing connected to the network and/or any combinations and/or any equivalents).

In some embodiments of the invention, the management system can receive spoken or other audio data representing a request for the location of the identified raw materials and/or the current status of the semi-finished products. The request can include a request for the current state of a rubber compounding cycle, and/or a request for the progress of the process for creating the compounding recipe by the station 12. A generated response can be represented in audio, visual, tactile (for example, by using a haptic interface) and/or virtual format.

One or more bags and/or pallets can include a transmitter and/or a receiver for facilitating communication between them and also with the control system in order to allow an autonomous flow. They can all communicate with a module (for example, via one or more wireless communication protocols) in order to receive information, for example in order to identify and reserve available pallets to be used with specific raw materials and in order to identify and reserve spaces available in the storage systems. The module can generate location and pallet assignments based, for example, on the type of raw material necessary in order to carry out the process at a certain production level of the station 12.

In one embodiment, the process can include a step of classifying the generated flows by self-learning means. This step includes training the management system to recognize the best flow for a chosen rubber compound recipe. The training step includes the reception of an identification of at least one raw material to be used in the chosen rubber compound recipe and the reception of an identification of at least one destination for the identified raw material. This step also includes the step of determining the availability of at least one identified destination in the station 12 (being at least a production level 12a, 12b, 12c of the station) and the step of transferring the identified raw material to the identified destination. The best available destination can be identified based on a step of classifying all the production levels that need the identified raw materials. The training step can also include the step of determining an identified destination that supports the best flow, as determined on the basis of the time necessary in order to make the chosen rubber compound recipe and/or the raw materials that remain available. The best available identified destination can be the identified destination having the earliest availability for accepting the identified raw material. The best available identified destination can be the identified destination having the most capacity to support the generation of a certain production volume of the chosen rubber compound recipe. The best flow can change from one cycle to the next depending on the current state of the system (for example, depending on the storage level of semi-finished products in the semi-finished product storage system 16). The control system can be filled with data corresponding to favorable flows for each of a plurality of chosen rubber compound recipes.

The terms "at least one" and "one or more" are used interchangeably. The ranges described as being situated "between a and b" include the values "a" and "b".

Although specific embodiments of the disclosed apparatus are shown and described, it should be noted that various changes, additions and modifications can be made without departing from the spirit or the scope of the present disclosure. Therefore, no limitation should be imposed on the scope of the invention described, apart from those disclosed in the appended claims.

The invention claimed is:

1. An automated flow management system for managing a flow of raw materials and a flow of semi-finished products in order to carry out one or more rubber compounding processes, the system comprising:
   a rubber compounding facility with a rubber compounding station in which compounding processes are carried out according to a selected rubber compound recipe, the rubber compounding station comprising several production levels that require provision of raw materials in order to carry out corresponding compounding processes at each production level; and
   automated storage means having several storage levels and one or more storage levels that are linked to each production level of the rubber compounding station, the automated storage means of the management system comprising:
      at least one raw material storage system with several storage levels that facilitate the storage, transfer and retrieval of the raw materials depending on the processes carried out at the production levels of the rubber compounding station, and with which the automated flow management system generates one or more flows of raw materials;
      a semi-finished product storage system with several storage levels at which the semi-finished products from the rubber compounding station are stored, wherein the semi-finished products can be allocated to locations depending on the processes carried out at the corresponding production levels in the rubber compounding station, and with which the automated flow management system generates one or more flows of semi-finished products; and
      one or more slave pallets permanently incorporated into each automated storage means that comprise virtual storage zones in order to facilitate management of stock and flows of raw materials and semi-finished products.

2. The automated flow management system according to claim 1, wherein the compounding facility comprises several sectors in which compounding processes are carried out, and each sector is dedicated to a distinct process with which the automated flow management system is linked, the sectors comprising:
   a sector with a connecting zone where the raw materials that arrive at the compounding facility are introduced;
   a sector with a raw material storage zone;
   a sector in which the rubber compounding station is arranged with at least one processing zone where the slave pallets are retrieved from the raw material storage system;
   a sector with a semi-finished product storage zone; and
   a sector with a transfer zone where the semi-finished products leave the compounding facility.

3. The automated flow management system according to claim 2, further comprising, at the connecting zone:
   at least one slave pallet dispenser where the slave pallets of the raw material storage system are stacked;
   an entry point arranged next to the at least one slave pallet dispenser in order for a slave pallet at the dispenser to be loaded with one or more incoming raw materials at the entry point;
   a control device that controls a shape of the transferred raw materials;
   an exit where non-compliant raw materials leave the automated flow management system;
   a revolving table which maneuvers a raw material in order for a unique raw material identification to be recognized;
   an access rail of the connecting zone that is aligned with the raw material storage system; and
   an autonomous vehicle that carries compliant raw materials to dedicated spaces in the automated storage system depending on data integrated within each unique identification.

4. The automated flow management system according to claim 2, further comprising, at the processing zone:

an exit where ordered raw materials leave the raw material storage system after having been retrieved, and the retrieved raw materials are transferred to the corresponding production level of the rubber compounding station;

a stacking station where the slave pallets are retrieved and stacked;

an optional cleaning station where the slave pallets are cleaned;

an entrance in order to accept empty dedicated pallets from a corresponding production level of the rubber compounding station; and a control device that ensures compliance of the dedicated pallets with dedicated spaces in the automated storage system.

5. The automated flow management system according to claim 1, further comprising at least one robot for selectively placing the raw materials in and selectively removing them from the raw material storage and selectively placing the semi-finished products in and removing them from the semi-finished product storage system.

6. The automated flow management system according to claim 2, further comprising at least one of the following elements:

transfer lines on which corresponding conveyors move relative to the raw material storage system and the semi-finished product storage system; and a control system that identifies the raw materials and manages them depending on an optimized flow in order to create the selected rubber compound recipe.

7. The automated flow management system according to claim 1, wherein the slave pallets of the raw material storage system are loaded with one or more raw materials depending on the selected rubber compound recipe; and the slave pallets of the semi-finished product storage system are loaded with one or more semi-finished products ordered depending on the selected rubber compound recipe.

8. The automated flow management system according to claim 7, wherein the raw materials comprise at least one raw material selected from the group consisting of one or more carbon blacks, one or more gums, one or more silicas, one or more chemical products and one or more sulfurs; and the semi-finished products comprise at least one material selected from the group consisting of one or more masterbatches, one or more semi-finished materials and one or more materials to be recycled.

9. An automated flow management process carried out by the automated flow management system according to claim 1 in a compounding facility that manufactures rubber compounds, the process comprising the following steps:

identifying a category for each of a plurality of raw materials to be used in the compounding facility, in which the identified category is determined from a plurality of different categories depending on properties of a selected rubber compound recipe;

identifying a destination in the automated flow management system to which the raw materials need to be transported for each identified category; and generating one or more flows of raw materials between the raw material storage system and the rubber compounding station, the generating comprising transporting the raw materials to the identified destination.

10. The automated flow management process according to claim 9, further comprising the following steps:

generating one or more flows of semi-finished products between the rubber compounding station and the semi-finished product storage system; and classifying the generated flows of raw materials and the generated flows of semi-finished products by self-learning means.

* * * * *